US007615110B2

(12) United States Patent
Leonard et al.

(10) Patent No.: US 7,615,110 B2
(45) Date of Patent: Nov. 10, 2009

(54) PHOTOINITIATORS FOR USE IN INTAGLIO PRINTING INKS

(75) Inventors: Michael W. Leonard, Kent (GB); John A. Dyer, Kent (GB); James R. Tucker, London (GB); Shaun L. Herlihy, Kent (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 10/599,551

(22) PCT Filed: Mar. 30, 2005

(86) PCT No.: PCT/US2005/010850

§ 371 (c)(1),
(2), (4) Date: Mar. 22, 2007

(87) PCT Pub. No.: WO2005/097925

PCT Pub. Date: Oct. 20, 2005

(65) Prior Publication Data

US 2007/0266869 A1 Nov. 22, 2007

(30) Foreign Application Priority Data

Apr. 1, 2004 (GB) ................................. 0407473.8
Sep. 21, 2004 (GB) ................................. 0420968.0
Feb. 1, 2005 (GB) ................................. 0502057.3

(51) Int. Cl.
C08F 2/50 (2006.01)
C08J 3/28 (2006.01)
C09D 11/10 (2006.01)
C09D 11/00 (2006.01)

(52) U.S. Cl. .............. 106/31.13; 106/31.6; 106/31.64; 523/160; 523/161; 522/6; 522/38; 522/100; 522/113; 522/114; 522/120; 522/121; 522/71; 522/74; 522/90; 522/96; 522/107; 522/178; 522/99; 522/173; 522/172; 522/909; 427/64; 427/160; 427/466; 427/508; 427/510; 427/511; 427/517

(58) Field of Classification Search ............ 522/6, 522/38, 100, 113, 114, 120, 121, 71, 74, 522/96, 90, 104, 107, 178, 99, 173, 172, 522/909; 106/31.13, 31.6, 31.64; 523/160, 523/161; 427/64, 160, 466, 508, 510, 511, 427/517

See application file for complete search history.

(56) References Cited

U.S. PATENT DOCUMENTS

| 3,097,096 | A | * | 7/1963 | Oster | 430/301 |
|---|---|---|---|---|---|
| 4,275,143 | A | * | 6/1981 | Sakurai | 430/307 |
| 4,358,475 | A | * | 11/1982 | Brown et al. | 427/453 |
| 4,401,470 | A | * | 8/1983 | Bridger | 106/31.72 |
| 4,764,215 | A | * | 8/1988 | Rudolph | 428/497 |
| 5,093,147 | A | * | 3/1992 | Andrus et al. | 427/7 |
| 5,201,943 | A | * | 4/1993 | Monnerat | 106/31.13 |
| 5,460,646 | A | * | 10/1995 | Lazzouni et al. | 106/31.34 |
| 5,614,008 | A | * | 3/1997 | Escano et al. | 523/161 |
| RE35,512 | E | * | 5/1997 | Nowak et al. | 101/454 |
| 5,630,869 | A | * | 5/1997 | Amon et al. | 106/31.37 |
| 5,665,151 | A | * | 9/1997 | Escano et al. | 106/31.15 |
| 5,755,860 | A | * | 5/1998 | Zhu | 106/31.15 |
| 5,798,147 | A | | 8/1998 | Beck et al. | |
| 5,837,042 | A | * | 11/1998 | Lent et al. | 106/31.14 |
| 5,880,176 | A | * | 3/1999 | Kamoto et al. | 523/172 |
| 5,939,468 | A | * | 8/1999 | Siddiqui | 523/161 |
| 6,234,537 | B1 | * | 5/2001 | Gutmann et al. | 283/86 |
| 6,348,519 | B1 | | 2/2002 | Kouichi et al. | |
| 6,432,715 | B1 | * | 8/2002 | Nelson et al. | 436/56 |
| 6,483,576 | B1 | * | 11/2002 | Gardner | 356/71 |
| 6,540,345 | B1 | * | 4/2003 | Wagner et al. | 347/103 |
| 6,644,764 | B2 | * | 11/2003 | Stephens, Jr. | 347/3 |
| 6,718,046 | B2 | * | 4/2004 | Reed et al. | 382/100 |
| 6,721,440 | B2 | * | 4/2004 | Reed et al. | 382/100 |
| 6,813,011 | B2 | * | 11/2004 | Gardner et al. | 356/71 |
| 6,832,783 | B2 | * | 12/2004 | Lawandy | 283/85 |
| 6,861,012 | B2 | * | 3/2005 | Gardner et al. | 252/301.36 |
| 6,881,915 | B2 | * | 4/2005 | Lawandy et al. | 209/584 |
| 6,891,959 | B2 | * | 5/2005 | Reed et al. | 382/100 |
| 6,899,752 | B2 | * | 5/2005 | Sekioka et al. | 106/31.32 |
| 6,908,505 | B2 | * | 6/2005 | Lawandy et al. | 106/31.23 |
| 7,407,538 | B2 | * | 8/2008 | Jackson | 106/31.27 |
| 7,427,030 | B2 | * | 9/2008 | Jones et al. | 235/491 |
| 7,524,366 | B2 | * | 4/2009 | Eiseman et al. | 106/31.27 |
| 2004/0029989 | A1 | * | 2/2004 | Veya et al. | 522/49 |
| 2005/0142292 | A1 | * | 6/2005 | Schmidt | 427/258 |

FOREIGN PATENT DOCUMENTS

| WO | WO0138445 | * | 5/2001 |
|---|---|---|---|
| WO | WO03035777 | * | 5/2003 |
| WO | WO 2005/016654 | | 2/2005 |

OTHER PUBLICATIONS

Decker et al. Perfomance analysis of acylphosphine oxides in photoinitiated polymerization. Polymer 42 (2001), pp. 7551-7560.*
Theodore Lustig. Serious Inks Fight Funny Money, Part 1. Graphics Monthly. Nov. 1995, p. 100.*
Miller et al. Modeling of Photobleaching for Photoinitiation of Thick Polymerization Systems. Journal of Polymer Science: Part A: Polymer Chemistry, vol. 40, 793-808 (2002).*

* cited by examiner

*Primary Examiner*—Sanza L McClendon
(74) *Attorney, Agent, or Firm*—Dickstein Shapiro LLP

(57) ABSTRACT

An intaglio printing ink, curing by free radical acrylate chemistry, which does not fluoresce in at least the visible region under ultraviolet light is prepared by using an acylphosphine oxide as the photoinitiator.

22 Claims, No Drawings

PHOTOINITIATORS FOR USE IN INTAGLIO PRINTING INKS

The present invention relates to the use of certain acylphosphine oxides as photoinitiators in energy-curable (e.g. ultraviolet-curable) intaglio printing inks.

Security documents are preferably printed by the intaglio printing process. The term "intaglio printing" as used in this application refers to the so-called "engraved steel die" or "copper plate" printing processes which are well known to those skilled in the art. The printing plates used herein are usually chromium plated, engraved nickel plates or cylinders, made by galvanic replication of an—often hand-engraved—original copper plate. The following does not apply to the also well known rotogravure or gravure printing processes, which rely on a different type of ink.

In intaglio printing, ink is applied under pressure to the engraved surface of a cylinder. Thus, not only does the ink fill the engravings of the cylinder, it is also applied to the planar non-image surface of the cylinder. The ink is then thoroughly wiped from the planar surface of the engraved cylinder before the printing process is carried out. This is commonly effected by a wiping cylinder contrarotating to the engraved cylinder so that the two surfaces which touch are moving in opposite directions. Given the right conditions and, crucially, the right ink, this will remove the surplus ink from the planar surface as well as a small amount of ink from the surface of the ink in the engravings, so that the only ink on the engraved cylinder is in the engravings. The substrate to be printed is then passed between the engraved cylinder and an impression material, which is typically another cylinder, with the application of considerable pressure between the engraved cylinder and the impression material, which is a hard but deformable material. The considerable pressure deforms the impression material, forcing the substrate to be printed into the engravings on the engraved cylinder. This results in the substrate picking up some ink, corresponding to the engravings on the surface of the engraved cylinder. The ink then has to be dried.

Because of the unique characteristics of intaglio printing, the inks used for other forms of printing, for example lithographic printing, cannot be used for intaglio, and the formulations tend to be completely different.

Plainly, the rheology of the ink is critical to its success. For oil based intaglio inks, the addition of organic solvent permits adjustment of rheology, and at the same time facilitates wiping of the excess ink from the non-image areas of the plate. Such solvents are not used in energy curable inks which are therefore tackier, and require the use of plasticiser to achieve the same effect.

In addition to the rheology and ease of removal of surplus ink, discussed above, intaglio printing inks must meet the following requirements:

They must remain on the engraved cylinder until the moment of printing when they must transfer readily and in a consistent manner to the substrate to be printed.

They must have good film-forming properties and the cured inks must be sufficiently flexible that they remain intact even when the printed matter (e.g. banknotes) is subject to abuse.

Once the substrate has been printed, the ink must not transfer back to other surfaces with which it may come into contact, especially other printed matter.

The cured ink must have excellent chemical and mechanical resistance so as to withstand the many diverse materials and conditions to which banknotes may be subject.

They must be safe for handling by all members of the public, including the very young.

It is also self-evident that, where the ink is to be cured by energy, e.g. ultraviolet or electron beam, any components added to the ink to achieve any of the above requirements must not interfere with the cure. Not surprisingly, it is difficult to meet all of these desiderata simultaneously.

The majority of intaglio inks in current use are printed on sheetfed presses. The main drying mechanism is by oxidation of the resin and oil component in the stack of printed matter, a process that typically takes several days to become substantially complete. This drying process has the disadvantage that wet ink can transfer to the unprinted side whilst the stack is being built, or, indeed, may transfer as a consequence of any movement of the stack during the period in which oxidative drying is taking place. Such a transfer of ink to the unprinted side is known in the industry as "set-off", and is normally considered a fault.

As a result, energy-curable, and specifically, ultraviolet (UV)-curable intaglio printing inks have been proposed. The use of a vehicle system that can be cured under the action of UV light offers immediate drying and eliminates the occurrence of set-off. For example, GB 1466470 discloses a UV-curable ink for copperplate intaglio printing which comprises specific amounts of a curable binder which is an ester or amide of acrylic acid, a pigment, a photoinitiator, an activator for the photoinitiator and an inert extender permeable to ultraviolet light. EP1,260,563 discloses UV intaglio ink formulations which are water-washable and which can easily be precipitated from the wiping solution at the post-wiping stage.

However, the main practical use nowadays of intaglio printing is security printing, for example of banknotes, and this commonly requires that the ink used should not fluoresce in the visible region under UV light. Specifically, banknotes are commonly printed on non-fluorescing paper and so a first test to determine if a note is counterfeit is to place it under a UV source. If the note fluoresces blue, it is almost certainly counterfeit. Against this background the printer has the option of applying inks that themselves either do or do not fluoresce, or indeed a combination of both types. Thus, in order to make best use of the security possibilities, it is important that the ink maker has sufficient flexibility of formulation to produce both fluorescent and non-fluorescent inks. Since the photoinitiator combinations proposed for use in the above patents do fluoresce in the visible region under UV light, this precludes the production of non-fluorescing inks, and the formulations cannot, therefore, in practice be used for a large number of the applications for which they would otherwise be expected to be useful.

We have now surprisingly found that acylphosphine oxide photoinitiators, which are free radical photoinitiators, do not fluoresce in the visible region under UV light and so can be used in energy-curable intaglio printing inks for security applications.

Acylphosphine oxides are known for use as photoinitiators in various other types of printing ink. For example, U.S. Pat. No. 6,777,459 B2 describes the use of compositions with mono and bis acyl phosphine oxides, and describes their applicability to UV curing inks, including screen print, flexographic, gravure and off-set printing inks. U.S. Pat. No. 4,710,523 and U.S. Pat. No. 4,298,738 describe some acylphosphine oxides and their use as photoinitiators in photopolymerisable surface coatings, finishes and printing inks. However, they do not suggest that these compounds may be used in intaglio printing inks, nor that the resulting inks do not fluoresce in the visible region under UV light.

Thus, the present invention consists in an energy curable intaglio printing ink, curing by free radical acrylate chemistry, and including a photoinitiator comprising an acylphosphine oxide, whereby the ink does not fluoresce in at least the visible light wavelength region when exposed to ultraviolet light.

"The visible light region" of the spectrum is that region normally visible to humans, and is generally in the range from 400 to 700 nm.

A preferred class of compounds for use in the present invention are those compounds of formula (I):

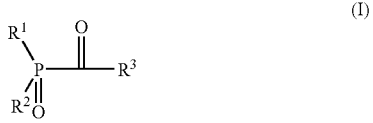

in which:

$R^1$ and $R^2$ are independently selected from $C_1$-$C_{12}$ alkyl groups, $C_3$-$C_7$ cycloalkyl groups, aryl groups, aralkyl groups, heterocyclic groups having from 3 to 7 ring atoms, of which at least one is an oxygen, sulphur or nitrogen atom and groups of formula —$COR^3$;

or $R^2$ represents a group of formula —$OR^4$, where $R^4$ represents a $C_1$-$C_6$ alkyl group, an aryl group, an aralkyl group or a cationic group or atom, or $R^2$ represents a group of formula (II):

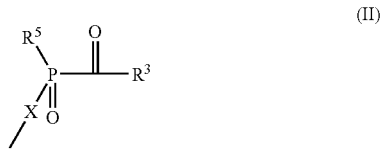

where X represents a $C_1$-$C_{18}$ alkylene group or a biphenyldiyl group, and $R^5$ represents any of the groups represented by $R^1$ or a group of formula —$OR^4$; and $R^3$ represents a $C_1$-$C_6$ alkyl group, an aryl group, a heterocyclic group having from 3 to 7 ring atoms, of which at least one is an oxygen, sulphur or nitrogen atom, or a group of formula (IV):

where Y represents a $C_1$-$C_{18}$ alkylene group a phenylene group, a cyclohexylene group or a biphenyldiyl group.

In the compounds of formula (I), where $R^1$ and/or $R^2$ represents an alkyl group, this may be a straight or branched chain alkyl group having from 1 to 12 carbon atoms. Examples of such groups include the methyl, ethyl, propyl, isopropyl, butyl, isobutyl, sec-butyl, t-butyl, pentyl, isopentyl, neopentyl, hexyl, isohexyl, heptyl, octyl, nonyl, decyl, undecyl and dodecyl groups. Of these groups, we particularly prefer those having from 1 to 8 carbon atoms, more preferably from 1 to 6 carbon atoms. The most preferred groups are those having from 1 to 4 carbon atoms. Where $R^3$ and/or $R^4$ represents an alkyl group, this may be a straight or branched chain group having from 1 to 6, preferably from 1 to 4, carbon atoms and examples of such groups include those listed above having that number of carbon atoms.

Where $R^1$ and/or $R^2$ represents a cycloalkyl group, this has from 3 to 7 ring carbon atoms, and examples include the cyclopropyl, cyclobutyl, cyclopentyl, cyclohexyl and cycloheptyl groups, of which the cyclopentyl and cyclohexyl groups are preferred.

Where $R^1$ and/or $R^2$ and/or $R^3$ and/or $R^4$ represents an aryl group, this is a group having, preferably, from 6 to 14 carbon atoms in an aromatic carbocyclic ring, and examples include the phenyl, naphthyl, anthryl and phenanthryl groups, of which the phenyl group is preferred. Such groups may be substituted or unsubstituted. If substituted, there is no particular restriction on the number of substituents, other than those imposed by the number of substitutable carbon atoms, and possibly by steric constraints, however, in general, from 1 to 4, more preferably from 1 to 3, substituents would be common. Examples of suitable substituents include the halogen atoms (e.g. chlorine, fluorine, bromine or iodine atoms), $C_1$-$C_6$ alkyl groups (e.g. those alkyl groups having from 1 to 6 carbon atoms included in the examples of alkyl groups represented by $R^1$ and/or $R^2$), $C_1$-$C_6$ alkoxy groups, $C_1$-$C_6$ alkylthio groups, and aryl groups (e.g. as exemplified here, and which may be substituted or unsubstituted, as defined here, provided that any aryl substituent may not itself be further substituted by an aryl group).

Where the substituent(s) on an aryl group is an alkoxy group, this may be a straight or branched chain group having from 1 to 6 carbon atoms, of which examples include the methoxy, ethoxy, propoxy, isopropoxy, butoxy, isobutoxy, sec-butoxy, t-butoxy, pentyloxy, isopentyloxy, neopentyloxy and hexyloxy groups.

Where the substituent(s) on an aryl group is an alkylthio group, this may be a straight or branched chain group having from 1 to 6 carbon atoms, of which examples include the methylthio, ethylthio, propylthio, isopropylthio, butylthio, isobutylthio, sec-butylthio, t-butylthio, pentylthio, isopentylthio, neopentylthio and hexylthio groups.

Where $R^1$ and/or $R^2$ and/or $R^4$ represents an aralkyl group, this may be an alkyl group, preferably having from 1 to 4 carbon atoms, which is substituted by from 1 to 3 aryl groups, which may be as defined and exemplified above. Preferred examples of such aralkyl groups include the benzyl, benzhydryl, trityl, phenethyl, 1-phenylethyl, 3-phenylpropyl, 4-phenylbutyl and naphthylmethyl groups, of which the benzyl group is preferred.

Where $R^1$ and/or $R^2$ and/or $R^3$ represents a heterocyclic group, this has from 3 to 7 ring atoms, of which at least one, and preferably 1 or 2, more preferably 1, is an oxygen atom, a nitrogen atom or a sulphur atom. More preferably, the group has 5 or 6 ring atoms, preferably of which one is an oxygen, nitrogen or sulphur atom. Examples of such groups include the thienyl, furyl, pyranyl, pyrrolyl, imidazolyl, pyrazolyl, pyridyl, pyrazinyl, pyrimidinyl, pyrrolidinyl, pyrrolinyl, imidazolidinyl, imidazolinyl, piperidyl, piperazinyl and morpholinyl groups, of which the thienyl and pyridyl groups are preferred.

Where $R^4$ represents a cationic group or atom, this may be, for example, an ammonium group, or a metal atom $(M)^+_x$, where M is a metal, e.g. sodium, potassium or lithium, and x is the reciprocal of the valence of the metal M.

Where X or Y represents an alkylene group, this may be a straight or branched chain group having from 1 to 18 carbon atoms, and examples include the methylene, ethylene, trimethylene, propylene, tetramethylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene, heptadecamethylene, and octadecamethylene groups.

A particularly preferred class of acylphosphine oxides to be used in the present invention are those compounds of formula (V):

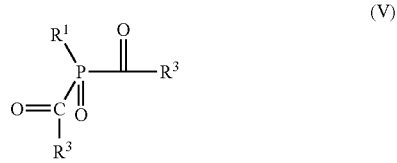

(V)

in which:

$R^1$ represents a $C_1$-$C_{12}$ alkyl group, a cyclohexyl group or an aryl group; and $R^3$ is as defined above.

We particularly prefer compounds of formula (V) in which each $R^3$ is independently selected from phenyl groups and phenyl groups having from 1 to 4 halogen and/or $C_1$-$C_6$ alkyl and/or $C_1$-$C_6$ alkoxy substituents.

Also preferred are compounds of formula (V) in which $R^1$ represents a $C_1$-$C_{12}$ alkyl group or a phenyl group which is unsubstituted or has from 1 to 3 $C_1$-$C_6$ alkyl or alkoxy substituents.

Another particularly preferred class of acylphosphine oxides to be used in the present invention are those compounds of formula (VI):

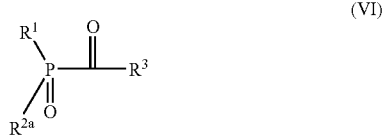

(VI)

in which:

$R^1$ and $R^3$ are as defined above; and $R^{2a}$ represents a $C_1$-$C_{12}$ alkyl group, a $C_3$-$C_7$ cycloalkyl group, an aryl group, an aralkyl group, a heterocyclic group having from 3 to 7 ring atoms, of which at least one is an oxygen, sulphur or nitrogen atom, or a group of formula —$OR^4$, where $R^4$ is defined above.

The most preferred class of compounds of the present invention are those compounds of formula (VII):

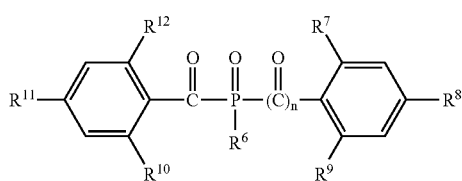

(VII)

in which:

n is 0 or 1;

$R^6$ represents a $C_1$-$C_{12}$ alkyl group, a $C_1$-$C_6$ alkoxy group, a phenyl group or a phenyl group having from 1 to 4 substituents selected from $C_1$-$C_6$ alkyl groups, $C_1$-$C_6$ alkoxy groups and halogen atoms; and $R^7$, $R^8$, $R^9$, $R^{10}$, $R^{11}$ and $R^{12}$ are the same as or different from each other and each represents a hydrogen atom, a $C_1$-$C_6$ alkyl group, a $C_1$-$C_6$ alkoxy group or a halogen atom.

Specific examples of photoinitiators which may be used in the present invention include: methyl 2,6-dimethylbenzoyl-phenylphosphinate, methyl 2,6-dimethoxybenzoyl-phenylphosphinate, 2,6-dimethylbenzoyldiphenylphosphine oxide, 2,6-dimethoxybenzoyldiphenylphosphine oxide, methyl 2,4,6-trimethylbenzoyl-phenylphosphinate, ethyl 2,4,6-trimethylbenzoyl-phenylphosphinate, potassium (2,4,6-trimethylbenzoyl)-(2'-hydroxybiphenyl-2-yl)phosphinate, 2,4,6-trimethylbenzoyldiphenylphosphine oxide, 2,4,6-trimethoxybenzoyldiphenylphosphine oxide, 2,3,6-trimethylbenzoyldiphenylphosphine oxide, methyl 2,4,6-trimethylbenzoyl-tolylphosphinate, ethyl 2,6-dichlorobenzoyl-phenylphosphinate, 2,6-dichlorobenzoyldiphenylphosphine oxide, 2,6-dibromobenzoyldiphenylphosphine oxide, 2-chloro-6-methylthiobenzoyldiphenylphosphine oxide, 2,6-dimethylthiobenzoyldiphenyl-phosphine oxide, 2,3,4,6-tetramethylbenzoyldiphenylphosphine oxide, 2-phenyl-6-methylbenzoyldiphenylphosphine oxide, methyl 2,4,6-trimethylbenzoyl-naphthylphosphinate, ethyl 2,4,6-trimethylbenzoyl-naphthylphosphinate, ethyl 2,6-dichlorobenzoyl-naphthylphosphinate, 1,3-dimethylnaphthalene-2-carbonyl-diphenylphosphine oxide, 1,3-dimethoxynaphthalene-2-carbonyl-diphenylphosphine oxide, 1,3-dichloronaphthalene-2-carbonyl-diphenylphosphine oxide, 2,8-dimethylnaphthalene-2-carbonyl-diphenylphosphine oxide, 2,4,6-trimethylpyridine-3-carbonyl-diphenylphosphine oxide, 2,4-dimethylfuran-3-carbonyldiphenylphosphine oxide, 2,4-dimethoxyfuran-3-carbonyldiphenylphosphine oxide, methyl 2,4,5-trimethylthiophene-3-carbonyldiphenylphosphinate, 2,4,5-trimethylthiophene-3-carbonyldiphenylphosphine oxide, bis (2,6-dimethoxybenzoyl)-2,4,4-trimethylpentyl-phosphine oxide and bis(2,4,6-trimethylbenzoyl)phenylphosphine oxide.

Other acylphosphine oxide photoinitiators may also be used, for example 1,10-bis[bis(2,4,6-trimethylbenzoyl)phosphine oxide]decane and a copolymer of 4-acryloyloxy-2,6-dimethylbenzoyl-diphenylphosphine oxide and butyl acrylate.

The most preferred acylphosphine oxides are 2,4,6-trimethylbenzoyl diphenylphosphine oxide, bis(2,4,6-trimethylbenzoyl)phenyl phosphine oxide, ethyl 2,4,6-trimethylbenzoyl diphenylphosphinate and bis(2,6-dimethoxybenzoyl)-2,4,4-trimethylpentylphosphine oxide.

These acylphosphine oxides are all known in themselves and may be prepared by known methods or by analogous methods to those known. They are described, for example in U.S. Pat. Nos. 4,298,738, 4,710,523 and 6,777,459, the disclosures of which are incorporated herein by reference.

Although it is a feature of the present invention that the photoinitiator comprises an acylphosphine oxide, if desired, other photoinitiators can be used in addition, provided that they also do not result in a cured ink which fluoresces in the visible region under UV light. For example, it would be possible to use a hybrid free radical/cationic curing system, with the free radical photoinitiator being the acylphosphine oxides of the present invention, and a suitable cationic initiator.

The printing inks of the present invention are designed to be cured by UV or EB (electron beam) radiation and typically include a binder comprising one or more oligomers and/or reactive monomers. Formulations are well-known and can be found in standard textbooks such as the series "Chemistry & Technology of UV & EB Formulation for Coatings, Inks &

Paints", published in 7 volumes in 1997-1998 by John Wiley & Sons in association with SITA Technology Limited.

Suitable oligomers (also referred to as prepolymers) include epoxy acrylates, acrylated oils, urethane acrylates, polyester acrylates, silicone acrylates, acrylated amines, acrylic saturated resins and acrylic acrylates. Further details and examples are given in "Chemistry & Technology of UV & EB Formulation for Coatings, Inks & Paints", Volume II: Prepolymers & Reactive Diluents, edited by G Webster, published in 1997 by John Wiley & Sons in association with SITA Technology Limited.

Because of the high viscosity of most oligomers, diluents are required to reduce the overall viscosity of energy curing ink or coating formulation, so as to assist in handling and application. Suitable diluents may include water or "reactive" monomers which are incorporated into the cured film. Reactive monomers are typically acrylates or methacrylates, and can be monofunctional or multifunctional. Examples of multifunctional monomers would include polyester acrylates or methacrylates, polyol acrylates or methacrylates, and polyether acrylates or methacrylates. Further details and examples are given in the book edited by G Webster (op. cit.).

To make inks suitable for the water wipe intaglio presses, the ink must be soluble in dilute caustic solutions. This can be achieved by using acid functional resins. These may be acrylate or methacrylate functional, and therefore reactive, or inert in UV and EB systems. Suitable examples include styrene maleic anhydride resins, such as SMA1440F available from Cray Valley, and aromatic acid methacrylate and acrylate half esters.

The inks will contain pigments as the colouring agent. The pigment may be any desired inorganic and/or organic pigment suitable for intaglio printing such as CI Pigment Yellow 12, CI Pigment Yellow 42, CI Pigment Yellow 93, CI Pigment Yellow 110, CI Pigment Yellow 173, CI Pigment Black 7, CI Pigment Black 11, CI Pigment Orange 34, CI Pigment Red 9, CI Pigment Red 22, CI Pigment Red 23, CI Pigment Red 57:1, CI Pigment Red 67, CI Pigment Red 122, CI Pigment Red 146, CI Pigment Red 185, CI Pigment Red 224, CI Pigment Red 242, CI Pigment Red 254, CI Pigment Green 7, CI Pigment Green 36, CI Pigment Blue 15, CI Pigment Blue 15:3, CI Pigment Violet 23, CI Pigment Violet 32, or CI Pigment Violet 37.

Preferably, the ink will contain one or more fillers (also called extenders) in an amount of about 1-35% based on the weight of the finished ink. Suitable fillers include china clay, calcium carbonate, calcium sulphate, talc, silica, corn starch, titanium dioxide, alumina and mixtures thereof.

The ink may also contain about 1 to 5%, based on the weight of the finished ink, of a wax to improve scuff resistance. Suitable waxes include carnauba waxes, montan waxes, polytetrafluoroethylene waxes, polyethylene waxes, Fischer-Tropsch waxes, silicone fluids and mixtures thereof.

Other additives may be incorporated in the ink, including adhesive reagents, antifoaming reagents, levelling reagents, flow reagents, antioxidants, ultraviolet absorbers, flame retardants, etc.

In addition, if desired, a plasticiser may be incorporated into the printing ink in order to facilitate the wiping process to remove surplus ink from the engraved cylinder. Examples of suitable plasticisers include:

Citrates, for example: acetyl tri(2-ethylhexyl) citrate, acetyl tributyl citrate, acetyl triethyl citrate, tributyl citrate, tricyclohexyl citrate, triethyl citrate, and triisoamyl citrate;

Epoxidised oils, fatty acids and esters thereof, for example: 2-ethylhexyl esters of epoxidised tall oil, epoxidised linseed oil, epoxidised soya fatty acid ethylhexyl ester, epoxidised soybean oil;

Fatty acids, which may be saturated or unsaturated, especially those having a molecular weight within the preferred range given above, for example hexanoic, octanoic, decanoic, lauric acid, myristic acid, palmitic acid, stearic acid, arachidic acid, behenic acid, lignoceric acid, lauroleic acid (dodecenoic acid), pentadecanoic acid, margaric acid, myristoleic acid, palmitoleic acid, oleic acid, gadoleic acid (eicosenoic acid), erucic acid, ricinoleic acid, linoleic acid, linolenic acid, licanic acid, eleostearic acid (octadec-9,11,13-trienoic acid), octadecatetraenoic acid, and octadecatraenoic acid;

Combinations of these fatty acids, especially mixtures found in nature, such a linseed oil fatty acid or tall oil fatty acid;

Sebacates, for example: sebacic acid 1,2-propanediol polyester, di-2-ethylhexy sebacate, dibutyl sebacate, and dioctyl sebacate; and Tall oil esters, for example: hexyl tallate, 2-ethylhexyl tallate, isooctyl tallate, and octyl epoxy tallate;

The plasticiser or wiping aid is preferably incorporated into the ink at a level of from 0.5% to 10%, more preferably from 3 to 5%, by weight of the finished ink.

In order to function properly as an intaglio printing ink, the viscosity of the ink should preferably be controlled within certain limits. Specifically, we prefer that the viscosity of the inks measured at 26° C. and a shear rate of 100 sec$^{-1}$ should be in the range 20-200 Pascal seconds, more preferably 50-125 Pascal seconds.

The invention also provides a method of producing a document, which comprises intaglio printing on a substrate which does not fluoresce in at least the visible region under ultraviolet light using an intaglio printing ink which includes a photoinitiator comprising an acylphosphine oxide, and curing the ink by exposure to a source of radiant energy.

The substrate is preferably a paper.

The method of the present invention is particularly suitable for the printing of security documents, such as banknotes. In this case, the paper or other substrate will be chosen from those materials commonly known for use as such documents.

The inks of the present invention can be used on standard intaglio presses fitted with UV lamps, and with a plate temperature of around 40° C.

The invention is further illustrated by the following non-limiting Examples.

EXAMPLES 1 & 2 & COMPARATIVE EXAMPLES 1-

The ingredients shown in the following Table 1 were weighed and mixed to form a paste. The paste was then fully mixed and dispersed using a three roll mill to produce a homogeneous, viscous paste ink, Mixture A.

TABLE 1

| Material | Amount (wt %) | Supplier |
| --- | --- | --- |
| Ebecryl 648 (epoxy acrylate) | 51.3 | UCB chemicals |
| Tripropylene glycol diacrylate (TPGDA) | 1.1 | Cray Valley |

TABLE 1-continued

| Material | Amount (wt %) | Supplier |
|---|---|---|
| Chromophtal LGLD (blue pigment) | 6.8 | Ciba |
| Precipitated $CaCO_3$ | 33.4 | Omya |
| Corn Starch | 2.5 | Cerestar |
| Carnauba wax | 3.7 | Eggar |
| Florstab UV-1 (UV stabiliser) | 1.2 | Kromachem |
| Total | 100 | |

Photoinitiator solutions were made by dissolving the test photoinitiators into a 50:50 solution of Ebecryl 648 and TPGDA at 33% concentration. These solutions were then mixed with mixture A by blending with a knife to produce the final ink for testing. The inks were printed using an engraved intaglio plate, using a Harry Rochat proofing press and analysed for the amount of cure and fluorescence. The fluorescence of the ink for practical purposes at an excitation of 364 nm and 254 nm must be less than that emitted by the paper. Fluorescence can be assessed visually under a light emitting at these wavelengths or by using UV spectrophotometer such as a Perkin Elmer LS50. The inks were cured using a 300 W/inch Ga doped, medium pressure mercury lamp, from Fusion UV.

The cure was assessed by contacting a piece of paper onto cured print using a hydraulic ram at 10 T spread over a disk with a diameter of 3 cm.

The photoinitiators evaluated are listed in Table 2, which also shows final ink formulations and the results of the assessment.

EXAMPLE 3

Waterwipe Ink

The first three ingredients shown below in Table 3 were mixed together using a Silverson high speed stirrer for approximately 30 minutes until a clear amber varnish was produced. The other ingredients were then added to this mixture and mixed to form a paste. The paste was then fully mixed and dispersed using a three roll mill to produce a homogeneous paste waterwipe ink.

TABLE 3

| Material | Amount (wt %) | Supplier |
|---|---|---|
| Ebecryl 657 | 30 | UCB chemicals |
| SMA1440F | 10 | Cray Valley |
| Sartomer SR494 | 17 | Cray Valley |
| Microtalc | 20.1 | Omya |
| Irgalite Blue LGLD | 5 | Ciba Geigy |
| Irgacure 819 | 4.9 | Ciba Geigy |
| Carnauba wax | 3 | Eggar |
| Florstab UV1 | 1 | Kromachem |
| † Tall oil fatty acid | 9 | Various |

The viscosity data is shown in the following Table 4.

TABLE 4

| Shear rate 1/s | 2 | 100 |
|---|---|---|
| Viscosity Pas at 26° C. | 170.1 | 50.9 |

TABLE 2

| Example | Photoinitiator | Mixture A | PI % | 50:50 Ebecryl 648:TPGDA | Rahn RCX-02-766 amine synergist | Supplier | Fluorescence (excitation 254 nm) | Fluorescence (excitation 365 nm) | Cure* |
|---|---|---|---|---|---|---|---|---|---|
| Comp 1 | Esacure ITX | 81.3 | 3.3 | 12.9 | 2.5 | Lamberti | Yes (bright blue) | Yes (bright blue) | −1 |
| 1 | Lucerin TPO† | 81.3 | 3.3 | 15.4 | — | BASF | No | No | +1 |
| 2 | Irgacure 819† | 81.3 | 3.3 | 15.4 | — | CIBA | No | No | +2 |
| Comp 2 | Benzophenone | 81.3 | 3.3 | 12.9 | 2.5 | IGM Resins | Yes (Dull green) | Yes (dull green) | −2 |
| Comp 3 | Irgacure 369 | 81.3 | 3.3 | 15.4 | — | Ciba | Yes | Yes | −2 |
| Comp 4 | Diethylthioxanthone | 81.3 | 3.3 | 12.9 | 2.5 | Lambson | Yes | Yes | −2 |
| Comp 5 | Photoinitiator combination 1 | 81.3 | 6.3 | 12.4 | — | — | Yes | Yes | +1 |
| Comp 6 | Photoinitiator combination 2 | 81.3 | 5.4 | 13.3 | — | — | Yes | Yes | +2 |
| Comp 7 | Omnipol TX | 81.3 | 3.3 | 12.9 | 2.5 | IGM Resins | Yes | Yes | −1 |

*−2 very poor to +2 very good
†acylphosphine oxides according the present invention.
ITX is 2-isopropylthioxanthone
Irgacure 369 is 2 benzyl-2-dimethyl amino-4' morpholinobutyrophenone
Irgacure 819 is Bis (2,4,6-trimethylbenzoyl)phenylphosphine oxide
Lucerin TPO is Diphenyl (2,4,6-trimethylbenzoyl)phosphine oxide
Omnipol TX is Poly(oxy-1,4-butandiyl), α-[[(9-oxo-9H-thioxanthenyl)oxy]acetyl]-ω-[[[(9-oxo-9H-thioxanthenyl)oxy]acetyl]oxy]

Photoinitiator Combination 1

| Photoinitiator | % |
|---|---|
| Esacure ITX | 50.00 |
| Lucerin TPO | 15.00 |
| Irgacure 369 | 35.00 |

Photoinitiator Combination 2

| Photoinitiator | % |
|---|---|
| Esacure ITX | 55.6 |
| Irgacure 819 | 44.4 |

EXAMPLE 4

Waterwipe Ink

The first three ingredients shown below in Table 5 were mixed together using a Silverson high speed stirrer for approximately 30 minutes until a clear amber varnish was produced. The other ingredients were then added to this mixture and mixed to form a paste. The paste was then fully mixed and dispersed using a three roll mill to produce a homogeneous paste waterwipe ink.

TABLE 5

| Material | Amount (wt %) | Supplier |
|---|---|---|
| Ebecryl 657 | 30 | UCB chemicals |
| SMA1440F | 10 | Cray Valley |
| Sartomer SR494 | 17 | Cray Valley |
| Microtalc | 20.1 | Omya |
| Irgalite Blue LGLD | 5 | Ciba Geigy |
| Lucirin TPO | 4.9 | Ciba Geigy |
| Carnauba wax | 3 | Eggar |
| Florstab UV1 | 1 | Kromachem |
| † Tall oil fatty acid | 9 | Various |

The viscosity data is shown in the following Table 6.

TABLE 6

| Shear rate 1/s | 2 | 100 |
|---|---|---|
| Viscosity Pas at 26° C. | 190.4 | 52.4 |

EXAMPLE 5

Paperwipe Ink

All the ingredients shown below in Table 7 were added together and mixed to form a paste. The paste was then fully mixed and dispersed using a three roll mill to produce a homogeneous paste paperwipe ink.

TABLE 7

| CN104 | 38.5 | Cray valley |
|---|---|---|
| Sartomer SR494 | 19.5 | Cray Valley |
| Microtalc | 22.6 | Omya |
| Irgalite Blue LGLD | 5.5 | Ciba Geigy |
| Lucirin TPO | 2.4 | Ciba Geigy |
| Irgacure 819 | 2.5 | Ciba Geigy |
| Carnauba wax | 3 | Shamrock |
| Florstab UV1 | 1 | Kromachem |
| † Tall oil fatty acid | 5 | Various |

The viscosity data is shown in the following Table 8.

TABLE 8

| Shear rate 1/s | 2 | 100 |
|---|---|---|
| Viscosity Pas at 26° C. | 653.1 | 54.5 |

The invention claimed is:

1. An energy curable intaglio security document printing ink, curing by free radical, acrylate chemistry, and including a photoinitiator comprising an acylphosphine oxide, whereby the security document printing ink does not fluoresce in at least the visible light wavelength region when exposed to ultraviolet light.

2. A printing ink according to claim 1, in which said acylphosphine oxide is a compound of formula (I):

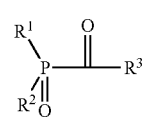

in which:

$R^1$ and $R^2$ are independently selected from $C_1$-$C_{12}$ alkyl groups, $C_3$-$C_7$ cycloalkyl groups, aryl groups, aralkyl groups, heterocyclic groups having from 3 to 7 ring atoms, of which at least one is a sulphur or nitrogen atom and groups of formula —$COR^3$, or $R^2$ represents a group of formula —$OR^4$, where $R^4$ represents a $C_1$-$C_6$ alkyl group, an aryl group, an aralkyl group or a cationic group or atom, or $R^2$ represents a group of formula (II):

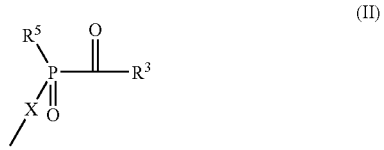

where X represents a $C_1$-$C_{18}$ alkylene group or a biphenyldiyl group, and $R^5$ represents any of the groups represented by $R^1$ or a group of formula —$OR^4$, and $R^3$ represents a $C_1$-$C_6$ alkyl group, an aryl group, a heterocyclic group having from 3 to 7 ring atoms, of which at least one is a sulphur or nitrogen atom, or a group of formula (IV):

where Y represents a $C_1$-$C_{18}$ alkylene group a phenylene group, a cyclohexylene group or a biphenyldiyl group.

3. A printing ink according to claim 2, in which said acylphosphine oxide is a compound of formula (V):

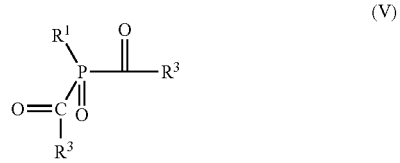

in which:

$R^1$ represents a $C_1$-$C_{12}$ alkyl group, a cyclohexyl group or an aryl group; and $R^3$ is as defined in claim 2.

4. A printing ink according to claim 3, in which each $R^3$ is independently selected from phenyl groups and phenyl groups having from 1 to 4 halogen and/or $C_1$-$C_6$ alkyl and/or $C_1$-$C_6$ alkoxy substituents.

5. A printing ink according to claim 4, in which $R^1$ represents a $C_1$-$C_{12}$ alkyl group or a phenyl group which is unsubstituted or has from 1 to 3 $C_1$-$C_6$ alkyl or alkoxy substituents.

6. A printing ink according to claim 2, in which said acylphosphine oxide is a compound of formula (VI):

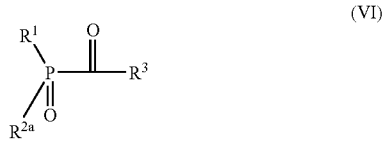
(VI)

in which:

$R^1$ and $R^3$ are as defined in claim 2; and $R^{2a}$ represents a $C_1$-$C_{12}$ alkyl group, a $C_3$-$C_7$ cycloalkyl group, an aryl group, an aralkyl group, a heterocyclic group having from 3 to 7 ring atoms, of which at least one is a sulphur or nitrogen atom, or a group of formula —$OR^4$, where $R^4$ is defined in claim 2.

7. A printing ink according to claim 2, in which said acylphosphine oxide is a compound of formula (VII):

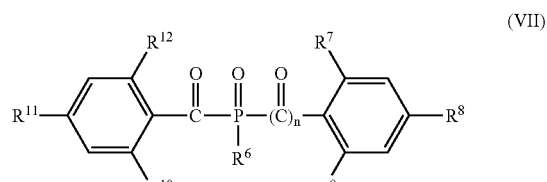
(VII)

in which:

n is 0 or 1;

$R^6$ represents a $C_1$-$C_{12}$ alkyl group, a $C_1$-$C_6$ alkoxy group, a phenyl group or a phenyl group having from 1 to 4 substituents selected from $C_1$-$C_6$ alkyl groups, $C_1$-$C_6$ alkoxy groups and halogen atoms; and $R^7$, $R^8$, $R^9$, $R^{10}$, $R^{11}$ and $R^{12}$ are the same as or different from each other and each represents a hydrogen atom, a $C_1$-$C_6$ alkyl group, a $C_1$-$C_6$ alkoxy group or a halogen atom.

8. A printing ink according to claim 2, in which said acylphosphine oxide is 2,4,6-trimethylbenzoyl diphenylphosphine oxide, bis(2,4,6-trimethylbenzoyl)phenylphosphine oxide, ethyl 2,4,6-trimethylbenzoyl diphenylphosphinate or bis(2,6-dimethoxybenzoyl)-2,4,4-trimethylpentylphosphine oxide.

9. A method of producing a security document, which comprises printing on a substrate which does not fluoresce in at least the visible region under ultraviolet light using an intaglio security document printing ink, curing by free radical acrylate chemistry, and which security document printing ink includes a photoinitiator comprising an acylphosphine oxide and which security document printing ink does not fluoresce in at least the visible light wavelength region when exposed to ultraviolet light, and curing the ink by exposure to a source of radiant energy.

10. A method according to claim 9, in which said radiant energy is ultraviolet.

11. A method according to claim 10, in which said acylphosphine oxide is a compound of formula (I):

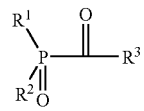
(I)

in which:

$R^1$ and $R^2$ are independently selected from $C_1$-$C_{12}$ alkyl groups, $C_3$-$C_7$ cycloalkyl groups, aryl groups, aralkyl groups, heterocyclic groups having from 3 to 7 ring atoms, of which at least one is a sulphur or nitrogen atom and groups of formula —$COR^3$, or $R^2$ represents a group of formula —$OR^4$, where $R^4$ represents a $C_1$-$C_6$ alkyl group, an aryl group, an aralkyl group or a cationic group or atom, or $R^2$ represents a group of formula (II):

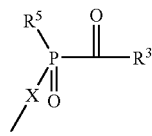
(II)

where X represents a $C_1$-$C_{18}$ alkylene group or a biphenyldiyl group, and $R^5$ represents any of the groups represented by $R^1$ or a group of formula —$OR^4$, and $R^3$ represents a $C_1$-$C_6$ alkyl group, an aryl group, a heterocyclic group having from 3 to 7 ring atoms, of which at least one is a sulphur or nitrogen atom, or a group of formula (IV):

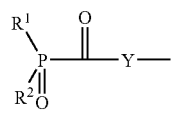
(IV)

where Y represents a $C_1$-$C_{18}$ alkylene group a phenylene group, a cyclohexylene group or a biphenyldiyl group.

12. A method according to claim 11, in which said acylphosphine oxide is a compound of formula (V):

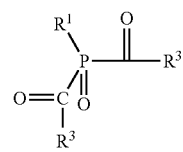
(V)

in which:

$R^1$ represents a $C_1$-$C_{12}$ alkyl group, a cyclohexyl group or an aryl group; and $R^3$ is as defined in claim 11.

13. A method according to claim 12, in which each $R^3$ is independently selected from phenyl groups and phenyl groups having from 1 to 4 halogen and/or $C_1$-$C_6$ alkyl and/or $C_1$-$C_6$ alkoxy substituents.

14. A method according to claim 13, in which $R^1$ represents a $C_1$-$C_{12}$ alkyl group or a phenyl group which is unsubstituted or has from 1 to 3 $C_1$-$C_6$ alkyl or alkoxy substituents.

15. A method according to claim 11, in which said acylphosphine oxide is a compound of formula (VI):

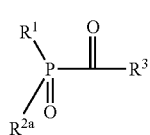
(VI)

in which:
$R^1$ and $R^3$ are as defined in claim 11; and
$R^{2a}$ represents a $C_1$-$C_{12}$ alkyl group, a $C_3$-$C_7$ cycloalkyl group, an aryl group, an aralkyl group, a heterocyclic group having from 3 to 7 ring atoms, of which at least one is a sulphur or nitrogen atom, or a group of formula —$OR^4$, where $R^4$ is defined in claim 11.

16. A method according to claim 11, in which said acylphosphine oxide is a compound of formula (VII):

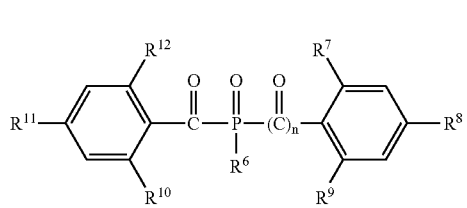
(VII)

in which:
n is 0 or 1;
$R^6$ represents a $C_1$-$C_{12}$ alkyl group, a $C_1$-$C_6$ alkoxy group, a phenyl group or a phenyl group having from 1 to 4 substituents selected from $C_1$-$C_6$ alkyl groups, $C_1$-$C_6$ alkoxy groups and halogen atoms; and
$R^7$, $R^8$, $R^9$, $R^{10}$, $R^{11}$ and $R^{12}$ are the same as or different from each other and each represents a hydrogen atom, a $C_1$-$C_6$ alkyl group, a $C_1$-$C_6$ alkoxy group or a halogen atom.

17. A method according to claim 11, in which said acylphosphine oxide is 2,4,6-trimethylbenzoyl diphenylphosphine oxide, bis(2,4,6-trimethylbenzoyl)phenylphosphine oxide, ethyl 2,4,6-trimethylbenzoyl diphenylphosphinate or bis(2,6-dimethoxybenzoyl)-2,4,4-trimethylpentylphosphine oxide.

18. A method according to claim 9, in which the substrate is a paper.

19. A method according to claim 9, in which the security document is a banknote.

20. A method according to claim 12, in which $R^1$ represents a $C_1$-$C_{12}$ alkyl group or a phenyl group which is unsubstituted or has from 1 to 3 $C_1$-$C_6$ alkyl or alkoxy substituents.

21. A method according to claim 9, in which said acylphosphine oxide is a compound of formula (I):

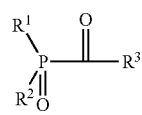
(I)

in which:
$R^1$ and $R^2$ are independently selected from $C_1$-$C_{12}$ alkyl groups, $C_3$-$C_7$ cycloalkyl groups, aryl groups, aralkyl groups, heterocyclic groups having from 3 to 7 ring atoms, of which at least one is a sulphur or nitrogen atom and groups of formula —$COR^3$,
or $R^2$ represents a group of formula —$OR^4$, where $R^4$ represents a $C_1$-$C_6$ alkyl group, an aryl group, an aralkyl group or a cationic group or atom, or $R^2$ represents a group of formula (II):

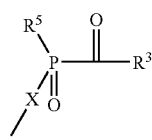
(II)

where X represents a $C_1$-$C_{18}$ alkylene group or a biphenyldiyl group, and $R^5$ represents any of the groups represented by $R^1$ or a group of formula —$OR^4$, and
$R^3$ represents a $C_1$-$C_6$ alkyl group, an aryl group, a heterocyclic group having from 3 to 7 ring atoms, of which at least one is a sulphur or nitrogen atom, or a group of formula (IV):

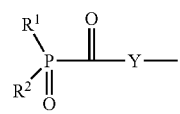
(IV)

where Y represents a $C_1$-$C_{18}$ alkylene group a phenylene group, a cyclohexylene group or a biphenyldiyl group.

22. A printing ink according to claim 3, in which $R^1$ represents a $C_1$-$C_{12}$ alkyl group or a phenyl group which is unsubstituted or has from 1 to 3 $C_1$-$C_6$ alkyl or alkoxy substituents.

* * * * *